United States Patent Office 3,830,918
Patented Aug. 20, 1974

---

3,830,918
METHOD OF TREATING PARKINSONISM AND PARKINSONOID SYNDROMES
Istvan Molnar, Theodor Wagner-Jauregg, and Ulrich Jahn, Zofingen, Switzerland, assignors to Siegfried Aktiengesellschaft, Zofingen, Switzerland
No Drawing. Filed May 17, 1972, Ser. No. 253,993
Int. Cl. A61k 27/00
U.S. Cl. 424—257                               20 Claims

ABSTRACT OF THE DISCLOSURE

A method of treating Parkinsonism and parkinsonoid syndromes induced by medical therapy comprising administering to the patient a thioester having the following formula:

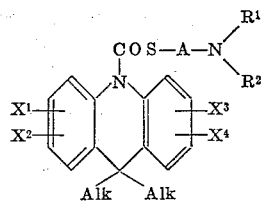

and pharmaceutically acceptable acid addition salts thereof, wherein: $R^1$ and $R^2$, which may be the same or different, are straight or branched-chain alkyl groups of up to 5 carbon atoms, one of which is optionally substituted by a phenyl group which itself is optionally substituted by one or more halogen atoms and/or alkyl, haloalkyl, alkoxy and/or amino groups, or $R^1$ and $R^2$ are joined together to form with the nitrogen atom a saturated heterocyclic ring optionally containing a further heteroatom; A is a straight or branched alkylene chain which optionally may be connected to $R^1$ or $R^2$ to constitute a ring; Alk represents an alkyl group of up to 4 carbon atoms; and $X^1$, $X^2$, $X^3$ and $X^4$, which may be the same or different, are hydrogen or halogen atoms, or optionally halogenated lower alkyl, alkoxy or alkylthio groups, or aryl, amino or nitrile groups.

---

This invention relates to a method of treating Parkinsonism and parkinsonoid syndromes induced by medical therapy comprising administering to the patient certain novel pharmacologically active thioesters.

The thioesters with which the invention is concerned are acridan derivatives represented by the general formula:

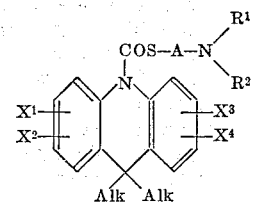

and pharmaceutically acceptable acid addition salts thereof, wherein $R^1$ and $R^2$, which may be the same or different, are straight or branched-chain alkyl groups of up to 5 carbon atoms, one of which is optionally substituted by a phenyl group which itself is optionally substituted by one or more halogen atoms and/or alkyl, haloalkyl, alkoxy and/or amino groups, or $R^1$ and $R^2$ are joined together to form with the nitrogen atom a saturated heterocyclic ring optionally containing a further hetero atom;

A is a straight or branched alkylene chain which optionally may be connected to $R^1$ or $R^2$ to constitute a ring;

Alk represents an alkyl group of up to 4 carbon atoms; and $X^1$, $X^2$, $X^3$ and $X^4$, which may be the same or different, are hydrogen or halogen atoms, or optionally halogenated lower alkyl, alkoxy or alkylthio groups, or aryl, amino or nitrile groups.

The pharmaceutically acceptable acid addition salts of the compounds of formula I may be derived from either organic or inorganic acids.

The compounds of formula I may be prepared either by reacting an acridan derivative of the general formula:

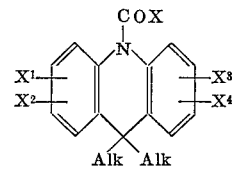

wherein $X^1$, $X^2$, $X^3$, $X^4$ and Alk have the same meanings as in formula I and X represents the radical of a compound capable of forming a functional derivative with a carboxyl group, for example a chlorine atom, and an amine of the general formula:

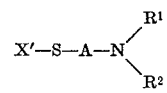

wherein A, $R^1$ and $R^2$ have the same meanings as in formula I and X' is a radical capable of combining with X under condensation conditions to form the compound X—X', for example a sodium atom, or by reacting an acridan derivative of formula II in which X represents —S—A—Hal, A having the same meaning as in formula I and Hal representing a halogen atom, with an amine of the general formula:

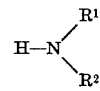

wherein $R^1$ and $R^2$ have the same meanings as in formula I. The acridan derivative of formula I so obtained may then, if desired, be converted into a pharmaceutically acceptable acid addition salt thereof by treatment with an inorganic or organic acid which will provide the required salt.

An especially advantageous way of preparing the compounds of formula I is that in which a corresponding aminomercaptan is first of all converted in a manner known per se to a metal mercaptide (for example the sodium mercaptide) and the latter is then, optionally in the presence of an organic or inorganic base, condensed with the appropriate 9,9-dialkylacridan-10-carboxylic acid chloride.

It has been found that thioesters of formula I and acid addition salts thereof have valuable pharmacodynamic properties. While exhibiting decidedly low toxicity, they act above all anticataleptically and tremolitically, thus opening out interesting prospects for the therapeutic use thereof against morbus Parkinson and parkinsonoid pathogenic agents.

The acid addition salts of the said thioesters, in particular those derived from organic acids such as, for example, succinic acid, malic acid, or alkanesulphonic acids, are distinguished, relative to the free bases, in many cases by superior resorptivity in the digestive tract.

A pharmacologically preferred group of compounds falling within the class of compounds represented by formula I is that in which $R^1$ and $R^2$ are methyl, ethyl or phenyl substituted-methyl groups, or are joined together to form a 5- or 6-membered saturated heterocyclic ring optionally containing an oxygen or further nitrogen atom;

A is an ethylene or propylene chain; Alk is methyl, and $X^1$, $X^2$, $X^3$ and $X^4$ are hydrogen or halogen.

The fact that acridan derivatives carrying a basic side chain in the 10-position exhibit pharmacological activity is known *per se*. Thus, for example, there are disclosed in U.S. Pat. No. 3,284,454, 10-dialkylaminoalkyl - 9,9 - dialkylacridans having a marked antidepressive effect and which have been used in therapy as psychopharmacological agents. One of the most authoritative experimental models for ascertaining antidepressive effects is considered to be the checking of the ptosis caused by tetrabenazine. It was, then, as interesting as it was unexpected that the compounds of the present invention acted relatively weakly in the antitetrabenazine test, in contradistinction to the said aminoalkylacridans, but that the anti-tremor and anti-catalepsy effect which they developed was proportionately stronger whereas these effects were, in the case of the comparison substances mentioned, far inferior to the antitetrabenazine effect. The fact that the introduction of the carbothiol group into the side chain should result in a reversal of activities of this kind must be deemed to be surprising.

In order to illustrate this fact, results of comparison tests which have been carried out are shown in the following table. The test substances designated by reference numerals therein are either esters derived from 9,9-dimethylacridan - 10 - carboxylic acid and thiols of the formula

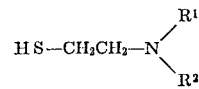

or salts of such esters; the basic terminal group—(and, where appropriate, also the acid added during salt formation) and the melting points of the appropriate test substances are indicated in the following list:

| Reference number | $-N\begin{matrix}R^1\\R^2\end{matrix}$ | Acid | Melting point, °C. |
|---|---|---|---|
| Mo 876 | —N(CH₃)₂ | | 110.5–111 |
| Mo 1284 | —N⟨morpholino⟩ | | 112–113 |
| Mo 1285 | —N⟨piperidino⟩ | | 127–128 |
| Mo 1289 | —N(CH₃)(CH₂—C₆H₅) | CH₃SO₃H | 161–162 |
| Mo 1297 | —N⟨ ⟩—OCH₃ | | 111 |
| Mo 1308 | —N⟨ ⟩N—CH₃ | | 128 |
| Mo 1314 | —N(C₂H₅)(CH₂—C₆H₅) | HCl | 144–146 |
| Mo 1315 | —N(CH₃)(CH₂—C₆H₄—OCH₃) | | 76–77 |
| Mo 1321 | —N(CH₃)₂ | HOOC—CH₂CH₂—COOH | 112–113 |
| Mo 1323 | —N⟨ ⟩ | CH₃SO₃H | 149–150 |
| Mo 1360 | —N(CH₃)₂ | C₂H₅SO₃H | 147–150 |

In the table, there are included, for comparison purposes, the corresponding values obtained with dimethacrin (10 - dimethylaminopropyl - 10 - dimethylacridan-cf. the above-identified U.S. Pat. No. 3,284,454), atropine sulphate and four known antiparkinson agents.

| Substance | Toxicity LD₅₀, mg./kg. mouse, oral (a) | Tremolysis mouse (b) | Catalepsy rat (c) | Ptosis rat (d) | Mydriasis mouse (e) | Salivation mouse (f) | a.e.f. b.c. |
|---|---|---|---|---|---|---|---|
| Mo 876 | 920 | 14 | 30 | 180 | 74 | 25 | 4,052 |
| Mo 1284 | 620 | 61 | 150 | | >400 | 82 | >2,222 |
| Mo 1285 | 1,600 | 42 | 90 | | 254 | 61 | 6,553 |
| Mo 1289 | 3,300 | 42 | 150 | 130 | >600 | 218 | >68,514 |
| Mo 1297 | 850 | 45 | 80 | | 170 | 73 | 2,930 |
| Mo 1308 | 740 | 50 | 120 | | ⟩500 | 82 | 5,056 |
| Mo 1314 | ¹3,000 | 45 | 100 | | ⟩500 | ⟩)500 | ² (>166,667) |
| Mo 1315 | 2,100 | >100 | 100 | | ⟩)500 | 580 | >60,900 |
| Mo 1321 | 1,300 | 22 | 85 | | 88 | 25 | 1,529 |
| Mo 1323 | 1,650 | 56 | 110 | | 115 | 32 | 985 |
| Mo 1360 | ³1,400 | 22 | 95 | 90 | 78 | 56 | 2,925 |
| Dimethacrin | 1,700 | 62 | >150 | 6.6 | 930 | >500 | 85,000 |
| Atropine sulfate | 560 | 2.8 | 40 | 50 | 0.9 | 0.28 | 1.26 |
| Ethylonzatropin-HBr | 86 | 15 | 40 | | 7 | 2.8 | 2.81 |
| Caramiphen | 485 | 43 | 47 | | 135 | 16.5 | 534.5 |
| Trihexyphenidyl | 365 | 21 | 29 | | 23.5 | 5.2 | 73.23 |
| Orphenadrin | 310 | 53 | 64 | | 66 | 30 | 180 |

¹ Suspension.
² Not directly comparable with the other values, since the toxicity was determined with a suspension, due to inadequate solubility of this substance.
³ Approximately.

The reaction data shown in columns (b) to (f) are based on the determination of the following effects:

(b) Checking of the tremor produced by oxotremorin (cf. Jahn and Wagner-Jauregg in "Arzneimittelforschung," 15, 534 (1965));
(c) Checking of the catalepsy produced by perphenazine, according to Taeschler et al., "Schweiz. Med. Wochenschrift" 92, 1542 (1962);
(d) Checking of the ptosis produced by tetrabenazine, according to Giurgea et al., "Med. exp.," 9, 249 (1963);
(e) and (f) Mydriasis and salivation inhibition as undesirable side-effects of the test substances, according to Hausler and PJahn, "Arzneimittelforschung," 15, 878 (1965) or Richter, "Acta pharmacol. et toxicol." 24, 243 (1966).

The quotients reproduced in the last column of the table show the relationship between the central anticholinergic $ED_{50}$ values, which are desirable in view of suitability as an antiparkinson agent, on the one hand, and the $LD_{50}$ and the undesirable peripheral, atropine-like $ED_{50}$ values on the other hand. These quotients show that the substances obtained in accordance with the invention are clearly superior to the known antiparkinson agents mentioned by way of comparison. In the case of the chemically closely related dimethacrin, it is true that the said quotient is of the same order of magnitude as in the case of the products of the present invention; however, relatively to dimethacrin, the difference in the efficacy quality is obvious as soon as the quotient of the central anticholinergic and antidepressive psychotropes $ED_{50}$ is considered;

|  | $\frac{b.c.}{d}$ |
|---|---|
| Mo 867 | 2.3 |
| Mo 1289 | 48.5 |
| Mo 1360 | 23.2 |
| Dimethacrin | >1409.1 |
| (Atropin sulphate) | >2.24 |

These numerical data show that the psychotropic effect component which is not entirely desirable for an antiparkinson agent is, surprisingly, in the case of the products of the invention, weaker by very much more than a power of ten than in the case of dimethacrin.

It will be appreciated that for therapeutic use, the compounds of the invention will normally be administered in the form of a pharmaceutical composition comprising, as an essential active ingredient, an acridan derivative of formula I, or a pharmaceutically acceptable acid addition salt thereof, and a pharmaceutical carrier or excipient therefor. Preferably the composition will be made up in a dosage unit form appropriate to the desired mode of administration, for example a tablet or capsule for oral administration or a sterile solution packaged in a sealed ampule for parenteral administration. For example, the active compound (the acridan derivative of formula I or a pharmaceutically acceptable acid addition salt thereof) may be administered to the patient one to six times per day orally in the form of a capsule containing about 25 mg. of the active compound, such as, for example, Mo 1289.

The following are examples of preparing the active compounds.

Example 1

To a solution of 7.3 g. of 2-piperidinoethanethiol in 150 ml. of ether, a suspension of 2.6 g. of 50% sodium hydride in 50 ml. of anhydrous ether was added. After boiling for 1 hour, the reaction mixture was cooled to 0° C., whereupon 13.5 g. of 9,9-dimethylacridan-10-carboxylic acid chloride (prepared from 9,9-dimethylacridan and phosghene—cf. Swiss Specification No. 426,821) were added and the mixture was heated for a further 6 hours to boiling temperature. After cooling to ambient temperature, the precipitated sodium chloride was filtered in a Buchner funnel fitted with a filter cell. On further cooling, there was immediately precipitated out of the filtrate the 9,9-dimethylacridan-10-carboxylic acid-(2-piperidino-1-ethanethiol)-ester, as a crystalline base of high purity. Melting point 127–128° C.; yield 92% of theoretical.

If, instead of 2-piperidino-1-ethanethiol, a corresponding quantity of 2-(4-methoxypiperidino)-1-ethanethiol is employed, the latter being obtainable for example from equivalent quantities of 4-methoxypiperidine and ethylene sulphide by boiling for 4 hours in absolute dioxane (boiling point$_{0.05}$ 90–105° C.) there is obtained, in an analogous manner, 9,9-dimethylacridan-10-carboxylic acid-(4-methoxypiperidino)-ethanethiol ester, melting point 111° C.

In an analogous manner, on using pyrrolidino ethanethiol and morpholino ethanethiol, there is obtained respectively the 9,9-dimethylacridan-10-carboxylic acid-pyrroldino-ethanethiol ester (melting point of the hydrochloride salt 189–190° C.) or the 9,9-dimethylacridan-10-carboxylic acid-morpholino-ethanethiol ester (melting point 112–113° C.

Example 2

From 9.1 g. of 2-(benzylmethylamino)-ethanethiol, 2.6 g. of 50% sodium hydride and 13.5 g. of 9,9-dimethylacridan-10-carboxylic acid chloride, there was prepared in accordance with the process described in Example 1 the corresponding ester which was converted to the aqueous phase out of the ether solution by means of 0.5 N methanesulphonic acid. It was made alkaline with concentrated aqueous ammonia, whereupon the basic ester precipitated and was shaken out with methylene chloride. The organic phase supplied, after drying and concentration, 19.5 g. of 9,9-dimethylacridan-10-carboxylic acid-(2-benzylmethylamino-1-ethanethiol) ester as a viscous oil from which, by treating with alcoholic methanesulphonic acid, the corresponding methanesulphonice acid salt was obtained; Melting point 161–161° C.; yield 83% of the theoretical.

The 2-(benzylmethylamino)-ethanethiol employed as the starting product may be prepared from benzylmethylamine and ethylene sulphide by boiling for 3 hours in absolute dioxane and may be purified by distillation;

Boiling point$_{0.6}$ ---------------- ° C__ 96–97
$n_D^{20}$ ---------------- 1.545
$d^{20}$ ---------------- 1.007

Under similar conditions, using 2-(4-chlorobenzylmethylamino)-ethanethiol (prepared from 4-chlorobenzylmethylamine and ethylene sulphide, boiling point$_{0.02}$ 135–145° C., $n_D^{20}$=1.5508) there is obtained 9,9-dimethylacridan-10-carboxylic acid-(4-chlorobenzylmethylamino)-ethanethiol ester, melting point of the base 74.5–75° C. and, on using 2-(4-methylpiperazino)-ethanethiol (prepared from 1-methylpiperazine and ethylene sulphide, boiling point$_{15}$ 109° C.) there is obtained 9,9-dimethylacridan-10-carboxylic acid-(4-methylpiperazino)-ethanethiol ester; melting point of the base 128° C. If, as aminomercaptan, dimethylaminoethanethiol is used, there is correspondingly obtained 9,9 - dimethylacridan-10-carboxylic acid-dimethylaminoethanethiol ester which, as base, melts at 110.5–111° C. and as ethanesulphonic acid salt melts at 147–150° C.

Further thioesters and thioester salts obtainable in an analogous manner are:

9,9-dimethylacridan - 10 - carboxylic acid-(2-chlorobenzylmethylamino)-ethanethiol ester, melting point 77–79° C.;

2-chloro-9,9-dimethylacridan - 10-carboxylic acid-piperidinoethanethiol ester hydrochloride, melting point 237–239° C.;

2-chloro-9,9-dimethylacridan - 10-carboxylic acid-diethylaminoethanethiol ester hydrochloride, melting point 238–240° C.;

9,9-dimethylacridan-10-carboxylic acid-(2-dimethylamino-1-propanethiol)-ester hydrochloride, melting point 240–244° C.;

9,9-dimethylacridan-10 - carboxylic acid-(2-piperidino-1-propanethiol)-ester hydrochloride, melting point 225–266° C.; and 9,9-dimethylacridan - 10 - carboxylic acid-(benzylethylamino)-ethanethiol ester hydrogen tartrate, melting point 134–136° C.

The active compounds described herein are of particular value in that they alleviate the Parkinson-like symtoms which are known to be induced by treatment of diseases such as schizophrenia by administering drugs such as phenothiazine derivatives. As the latter are widely used today it is very desirable to have means for alleviating the undesirable side effects caused by such use. As a matter of fact, the parkinsonoid syndrome caused by medicaments cannot be combatted to a satisfactory extent by the "classical" Parkinsonism remedies.

We claim:

1. A method of treating a patient having Parkinsonism and parkinsonoid syndromes induced by medical therapy comprising administering to the patient an effective amount of a thioester having the following formula:

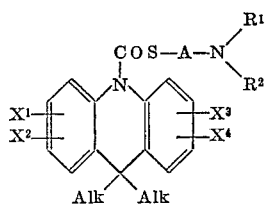

or a pharmaceutically acceptable acid addition salt thereof, wherein A is alkylene; $X^1$, $X^2$, $X^3$, and $X^4$ are independently selected from the group consisting of hydrogen and halogen; $R^1$ and $R^2$ are independently selected from the group consisting of alkyl containing up to five carbon atoms, benzyl, and substituted benzyl; and Alk is alkyl containing up to four carbon atoms.

2. A method according to claim 1, wherein $X^1$, $X^2$, $X^3$ and $X^4$ are hydrogen.

3. A method according to claim 2, wherein $R^1$ and $R^2$ are independently selected alkyl containing up to five carbon atoms.

4. A method according to claim 3, wherein Alk is methyl.

5. A method according to claim 4, wherein A is selected from the group consisting of ethylene and propylene and $R^1$ and $R^2$ are independently selected from the group consisting of methyl and ethyl.

6. A method according to claim 5, wherein A is ethylene.

7. A method according to claim 6, wherein $R^1$ and $R^2$ are methyl.

8. A method according to claim 7, wherein the acid addition salt is a lower alkanesulphonic acid salt of the thioester.

9. A method according to claim 8, wherein the acid addition salt is the ethanesulphonic acid salt of the thioester.

10. A method according to claim 1, wherein $R^1$ and $R^2$ are independently selected alkyl containing up to five carbon atoms.

11. A method according to claim 1, wherein $R^1$ is alkyl containing up to five carbon atoms.

12. A method according to claim 11, wherein A is selected from the group consisting of ethylene and propylene.

13. A method according to claim 12, wherein $R^1$ is selected from the group consisting of methyl and ethyl and $R^2$ is selected from the group consisting of methyl, ethyl, benzyl and substituted benzyl.

14. A method according to claim 11, wherein Alk is methyl.

15. A method according to claim 14, wherein A is ethylene; $X^1$, $X^2$, $X^3$ and $X^4$ are hydrogen; $R^1$ is methyl; and $R^2$ is benzyl.

16. A method according to claim 15, wherein the acid addition salt is a lower alkanesulphonic salt of the thioester.

17. A method according to claim 16, wherein the acid addition salt is the methanesulphonic acid salt of the thioester.

18. A method according to claim 14, wherein $R^2$ is selected from the group consisting of alkyl containing up to five carbon atoms, benzyl, methoxybenzyl, and chlorobenzyl.

19. A method according to claim 11, wherein $X^1$, $X^2$, $X^3$ and $X^4$ are independently selected from the group consisting of hydrogen and chlorine.

20. A method according to claim 11, wherein the acid addition salt is a lower alkanesulphonic acid salt of the thioester.

References Cited

UNITED STATES PATENTS

| | | | |
|---|---|---|---|
| 3,284,454 | 11/1966 | Häring et al. | 424—250 |
| 3,452,021 | 6/1969 | Meisels et al. | 424—257 |
| 3,642,997 | 2/1972 | Shen et al. | 424—257 |

STANLEY J. FRIEDMAN, Assistant Examiner

U.S. Cl. X.R.

424—248, 250